US008896787B2

(12) United States Patent
Kim et al.

(10) Patent No.: US 8,896,787 B2
(45) Date of Patent: Nov. 25, 2014

(54) LIGHT-EMITTING ASSEMBLY AND INTERACTIVE DISPLAY DEVICE HAVING THE SAME

(75) Inventors: Joong-Hyun Kim, Asan-si (KR); Dong-Kwon Kim, Asan-si (KR); Min-Young Song, Asan-si (KR)

(73) Assignee: Samsung Display Co., Ltd. (KR)

( * ) Notice: Subject to any disclaimer, the term of this patent is extended or adjusted under 35 U.S.C. 154(b) by 440 days.

(21) Appl. No.: 13/243,947

(22) Filed: Sep. 23, 2011

(65) Prior Publication Data

US 2012/0249438 A1    Oct. 4, 2012

(30) Foreign Application Priority Data

Mar. 29, 2011 (KR) .............................. 2011-0028026

(51) Int. Cl.
*F21V 7/04* (2006.01)
*G06F 3/041* (2006.01)

(52) U.S. Cl.
CPC .................................... *G06F 3/0412* (2013.01)
USPC ............................................ 349/65; 362/613

(58) Field of Classification Search
CPC .................... G02F 1/3338; G02F 2001/13312; G02F 1/133615
USPC ............................................ 349/65; 362/613
See application file for complete search history.

(56) References Cited

U.S. PATENT DOCUMENTS

| 2006/0262569 A1* | 11/2006 | Kim et al. ...................... 362/626 |
| 2008/0129927 A1* | 6/2008 | Hamada et al. .................. 349/65 |
| 2010/0110329 A1* | 5/2010 | Kubota et al. ................... 349/65 |
| 2010/0208490 A1* | 8/2010 | Tsuchiya et al. ............... 362/606 |
| 2010/0238136 A1* | 9/2010 | Chang ........................... 345/175 |
| 2012/0229422 A1* | 9/2012 | Hwang et al. ................. 345/175 |
| 2012/0230050 A1* | 9/2012 | Kim et al. ..................... 362/602 |

FOREIGN PATENT DOCUMENTS

| JP | 2005-024866 | 1/2005 |
| JP | 2009-032005 | 2/2009 |
| KR | 1020090026957 A | 3/2009 |
| KR | 1020090051613 A | 5/2009 |

* cited by examiner

*Primary Examiner* — Bumsuk Won
*Assistant Examiner* — Ryan Crockett
(74) *Attorney, Agent, or Firm* — Innovation Counsel LLP (57) ABSTRACT

A light-emitting assembly includes a light guide plate (LGP), a first infrared light-emitting part, a second infrared light-emitting part and a visible light-emitting part. The LGP has printed circuit patterns formed on a lower surface thereof. The first infrared light-emitting part includes a plurality of first infrared light-emitting diodes (LEDs) disposed at a first side of the LGP and spaced apart by intervals having different sizes. The second infrared light-emitting part includes a plurality of second infrared LEDs disposed at a second side of the LGP and spaced apart by intervals having different sizes. The visible light-emitting part includes a plurality of visible LEDs disposed at a third side of the LGP and spaced apart by intervals having different sizes, so that infrared light and visible light that is emitted from the two different kinds of light sources may be uniformly provided to a touch screen panel.

18 Claims, 10 Drawing Sheets

LIGHT-EMITTING ASSEMBLY AND INTERACTIVE DISPLAY DEVICE HAVING THE SAME

PRIORITY STATEMENT

This application claims priority under 35 U.S.C. §119 to Korean Patent Application No. 2011-0028026, filed on Mar. 29, 2011 in the Korean Intellectual Property Office (KIPO), the contents of which are herein incorporated by reference in their entirety.

BACKGROUND

1. Field of the Invention

Example embodiments of the present invention relate to a light-emitting assembly and an interactive display device having the light-emitting assembly. More particularly, example embodiments of the present invention relate to a light-emitting assembly capable of providing a touch screen panel that uses infrared lights and visible lights in a uniform manner, and an interactive display device having the light-emitting assembly.

2. Description of the Related Art

Touch panels are currently used in a wide variety of devices and allow a user to input information by simply touching an icon or area defined on the touch panel. For example, touch panels are now used in cell phones, Personal Digital Assistants (PDAs), computers, vending machines, various medical equipment, etc. Many business and government agencies also use kiosks system that include touch panels that the user can touch to input or request information. Navigation systems provided in vehicles or cell phones also use touch panels.

A panel that performs both a display function and a touch function is referred to herein as a touch screen panel. In a touch screen panel, a display function is used to display information on the panel, and a touch function is used to receive information from the user through application of pressure to the outside of the panel. The second substrate of the touch screen panel includes a photo sensor and a switching element controlling the photo sensor. When pressure is applied to the outside surface of the panel, the photo sensor absorbs an incident light having a specific wavelength to generate a photo current.

A central process unit (CPU) connected to the touch screen panel may calculate a touch position by using a difference between the photo current and a dark current generated by the photo sensor before the incident light is provided to the photo sensor. Upon being touched, the incident light absorbed into the photo sensor has a wavelength different from that of a visible light used for displaying the image in the touch screen panel. For example, the incident light absorbed into the photo sensor may be an infrared light.

Thus, a light-emitting assembly providing the touch screen panel with light may include both a first light source emitting infrared light and a second light source emitting visible light.

A direct-illumination type light-emitting assembly is used in order to uniformly receive the light from each of the first and second light sources, so as to provide the touch screen panel with the light in a uniform manner, and in order to improve luminance. For example, several of the first light sources are disposed on a surface facing the touch screen panel in a grid pattern, and each of the second light sources are disposed in a region divided by the four first light sources, so that the first and second light sources are uniformly disposed on the surface facing the touch screen panel. However, when the direct-illumination type light-emitting assembly is used, many light sources are needed so that the manufacturing cost and power consumption are both increased.

An edge-illumination type light-emitting assembly has also been employed as the light-emitting assembly and which does not have the drawbacks of the direct-illumination type light emitting assembly described above. In the edge-illumination type light-emitting assembly, first light sources emitting infrared light and second light sources emitting visible light are disposed at side portions of a light guide plate. However, in the edge-illumination type light-emitting assembly, the amount of receiving space for holding the first and second light sources may be limited. Moreover, it can be difficult to uniformly provide both the infrared lights and the visible lights to the touch screen panel.

SUMMARY

A light-emitting assembly capable of uniformly providing a touch screen panel with infrared light and visible light that are emitted from two different kinds of light sources is provided.

An interactive display device having the above-mentioned light-emitting assembly is also provided.

According to one aspect, a light-emitting assembly includes a light guide plate (LGP), a first infrared light-emitting part, a second infrared light-emitting part and a visible light-emitting part. The LGP has printed patterns formed on a lower surface thereof. The first infrared light-emitting part includes a plurality of first infrared light-emitting diodes (LEDs) disposed at a first side of the LGP, the first infrared LEDs spaced apart by first intervals and at least two of the first intervals have different sizes. The second infrared light-emitting part includes a plurality of second infrared LEDs disposed at a second side of the LGP, the second infrared LEDs spaced apart by second intervals and at least two of the second intervals have different sizes. The visible light-emitting part includes a plurality of visible LEDs disposed at a third side of the LGP, the visible LEDs spaced apart by third intervals and at least two of the third intervals have different sizes.

According to another aspect, an interactive display device includes a touch screen panel and a light-emitting assembly. The light-emitting assembly is disposed below the touch screen panel to provide the touch screen panel with lights for displaying an image and lights for identifying a touch. The light-emitting assembly includes an LGP, a first infrared light-emitting part, a second infrared light-emitting part and a visible light-emitting part. The LGP has printed patterns formed on a lower surface thereof. The first infrared light-emitting part includes a plurality of first infrared light-emitting diodes (LEDs) disposed at a first side of the LGP, the first infrared LEDs spaced apart by first intervals and at least two of the first intervals have different sizes. The second infrared light-emitting part includes a plurality of second infrared LEDs disposed at a second side of the LGP, the second infrared LEDs spaced apart by second intervals and at least two of the second intervals have different sizes. The visible light-emitting part includes a plurality of visible LEDs disposed at a third side of the LGP, the visible LEDs spaced apart by third intervals and at least two of the third intervals have different sizes.

According to a light-emitting assembly and an interactive display device having the light-emitting assembly, in an edge-illumination type light-emitting assembly, infrared LEDs emitting infrared light are disposed by different-sized intervals and visible LEDs emitting visible light are disposed by different-sized intervals, so that infrared light and visible light may be uniformly provided to a touch screen panel.

BRIEF DESCRIPTION OF THE DRAWINGS

The above and other features and advantages will become more apparent by describing example embodiments with reference to the accompanying drawings, in which.

DETAILED DESCRIPTION

Hereinafter, exemplary embodiments will be explained in detail with reference to the accompanying drawings.

Figure 1:
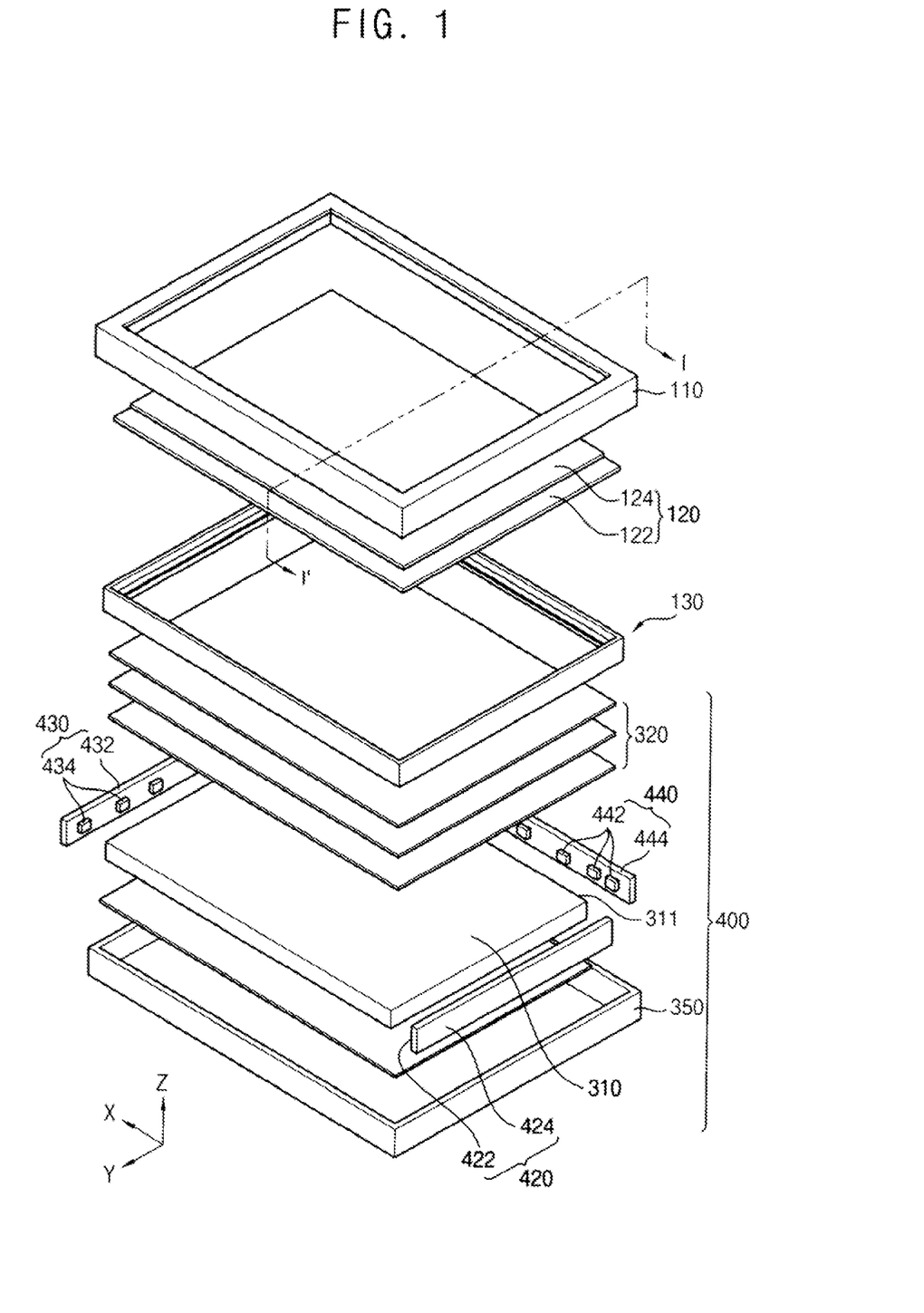
FIG. 1 is an exploded perspective view schematically showing a display device according to an exemplary embodiment.
Figure 2:
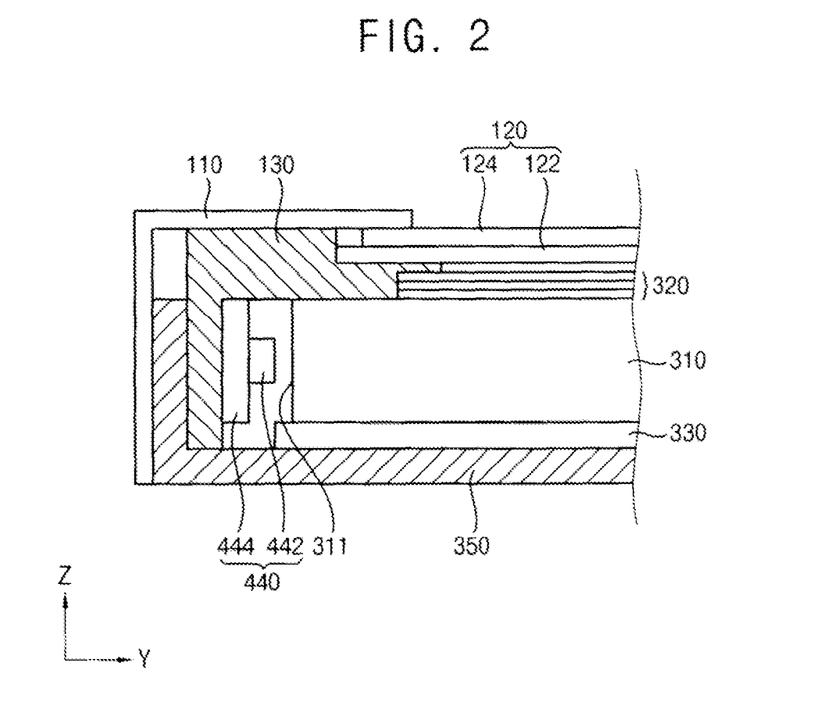
FIG. 2 is a cross-sectional view taken along a line I-I' of FIG. 1.

FIG. 1 is an exploded perspective view schematically showing a display device according to an exemplary embodiment. FIG. 2 is a cross-sectional view taken along a line I-I' of FIG. 1.

Referring to FIGS. 1 and 2, a display apparatus 100 according to one exemplary embodiment includes a top chassis 110, a touch screen panel 120 and a light-emitting assembly 400.

The top chassis 110 is disposed on the touch screen panel 120 to protect the touch screen panel 120 from an external impact. A window that exposes a display area of the touch screen panel 120 is formed through the top chassis 110.

The touch screen panel 120 may include a display substrate 122, a touch screen substrate 124 oppositing the display substrate 122, a liquid crystal layer (not shown) interposed between the display substrate 122 and the touch screen substrate 124. In the present exemplary embodiment, the touch screen panel 120 is a panel performing a display function and a touch function.

Figure 3:
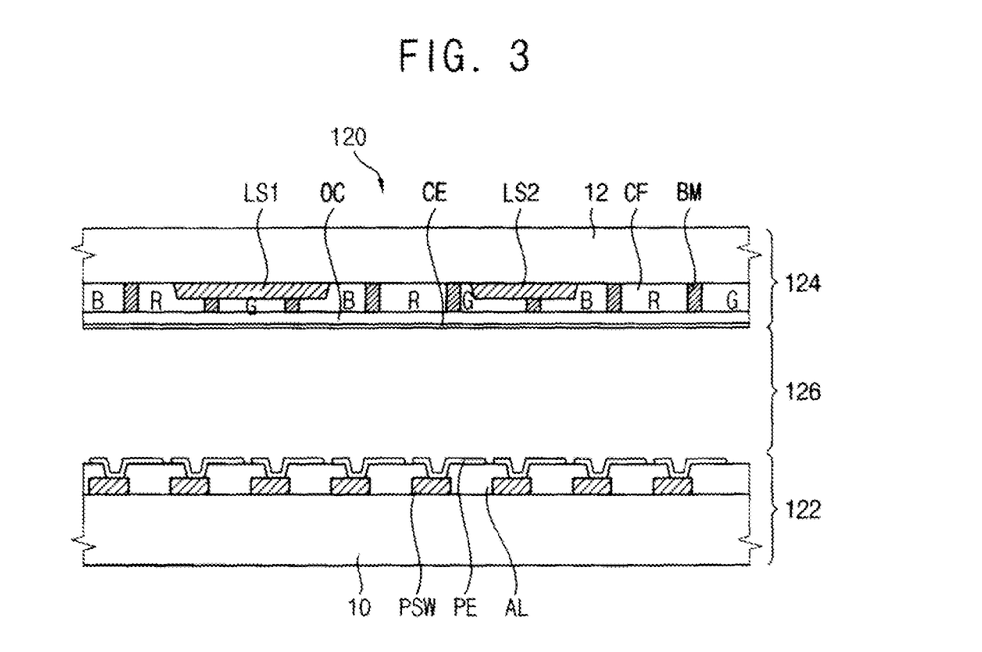
FIG. 3 is a cross-sectional view schematically explaining a touch screen panel of FIG. 1.

FIG. 3 is a cross-sectional view schematically explaining a touch screen panel 120 of FIG. 1.

Referring to FIG. 3, the touch screen panel 120 includes a display substrate 122, a touch screen substrate 124 and a liquid crystal layer 126. For one example, the touch screen panel 120 may sense an external touch to identify a position of an object which contacts the touch screen panel 120. For another example, the touch screen panel 120 may scan an image position thereon.

The display substrate 122 includes a pixel switching element PSW formed on a first base substrate 10, a pixel electrode PE electrically connected to the pixel switching element PSW and an array layer AL electrically connected to the pixel switching element PSW. The pixel electrode PE may define a unit pixel of the display substrate 122.

The touch screen substrate 124 is opposite to the display substrate 122 and is coupled with the display substrate 122, so that the liquid crystal layer 126 may be interposed between the touch screen substrate 124 and the display substrate 122. The touch screen substrate 124 may include a first light sensor LS1 and a second light sensor LS2.

The touch screen substrate 124 may further include a black matrix BM, a color filter CF that includes red R, green G, and blue B color filters, an overcoating layer OC and a common electrode CE formed on the substrate 12.

The common electrode CE faces the pixel electrode PE so that an electric field may be formed across the liquid crystal layer 126.

Each of the first and second light sensors LS1 and LS2 may be formed on an area of the touch screen substrate that corresponds to, and overlaps, an area of the display substrate 122 that includes three unit pixels. The first light sensor LS1 is a sensor which senses infrared light provided from the first and second infrared light-emitting parts 420 and 430, and the second light sensor LS2 is a sensor which senses visible light provided from the visible light-emitting part 440.

Although not shown in FIG. 3, each of the first and second light sensors LS1 and LS2 may include a sensing element substantially sensing light and a switching element electrically connected to the sensing element.

Referring to again FIGS. 1 and 2, the light-emitting assembly 400 includes a light guide plate (LGP) 310, a first infrared light-emitting part 420, a second infrared light-emitting part 430 and a visible light-emitting part 440, and is disposed below the touch screen panel 120. The light-emitting assembly 400 may provide the touch screen panel 120 with light, for example, light used for displaying an image and light used for identifying a touch. The light used for displaying images may be visible light, and the light used for identifying a touch may be infrared light.

The LGP 310 is disposed below the touch screen panel 120 to guide a path of lights generated from the visible light-emitting part 440 toward the touch screen panel 120. The LGP 310 has a flat shape. The LGP 310 includes a polymer resin having various characteristics such as high light transmittance, high heat resistance, high chemical resistance, superior mechanical strength, etc. Examples of the high polymer resin that may be used for the LGP 310 may include polymethylmethacrylate, polycarbonate (PC), polyamide, polyimide, polypropylene, polyurethane, etc. These may be used alone or in a combination thereof.

The first infrared light-emitting part 420 is disposed at a first short side of the LGP 310 and includes a plurality of infrared LEDs 422 and a first printed circuit board (PCB) 424 on which the infrared LEDs 422 are mounted. The infrared LEDs 422 provide the LGP 310 with infrared lights so as to identify a touch. A signal line (not shown) for providing the infrared LEDs 422 with a driving voltage may be formed on the first PCB 424.

The second infrared light-emitting part 430 is disposed at a second short side of the LGP 310 to include a plurality of infrared LEDs 434 and a second PCB 432 on which the infrared LEDs 434 are mounted. The infrared LEDs 434 provide the LGP 310 with infrared lights used to identify a touch. A signal line (not shown) for providing the infrared LEDs 434 with a driving voltage may be formed on the first PCB 432.

Figure 4:
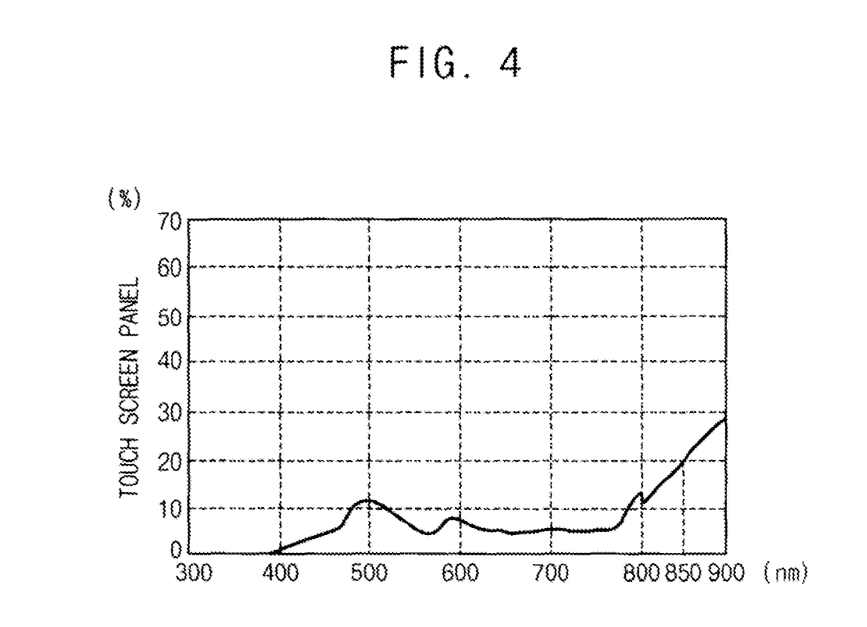
FIG. 4 is a graph showing a relationship between a transmittance of infrared lights emitted from an infrared LED and a touch screen display panel of FIG. 1.

FIG. 4 is a graph showing a relationship between the transmittance of infrared light emitted from an infrared LED through a touch screen display panel of FIG. 1 and the wavelength of the infrared light.

Referring to FIG. 4, the graph illustrates that the transmittance through the touch screen panel of infrared light having a wavelength greater than 850 nm is higher than the transmittance of light having wavelength in the visible range, about 400 nm to about 700 nm. Thus, when a touch is performed on the touch screen panel, a preceding direction of the infrared light having a wavelength greater than 850 nm is varied due to a break in the full reflection of an LGP. Thus, the transmittance of the touch screen panel 120 is no more than 20%, so that image sensors may detect infrared lights.

Referring to again FIGS. 1 and 2, the visible light-emitting part 440 is disposed at one long side 311 of the LGP 310 to include a plurality of visible LEDs 442 and a third PCB 444 on which the visible LEDs 442 are mounted. The visible LEDs 442 provide the LGP 310 with visible lights so as to display an image. A signal line (not shown) for providing the visible LEDs 442 with a driving voltage may be formed on the third PCB 444. In the present exemplary embodiment, the visible light-emitting part 440 may include, for example, a plurality of white LEDs emitting white light. Alternatively, the visible light-emitting part 440 may include, for example, at least one red LED emitting red light, at least one green LED emitting green light and at least one blue LED emitting blue light. In this case, the red lights, the green lights and the blue lights may be mixed with each other to be provided to the LGP 310 as white lights.

The light-emitting assembly 400 may further include optical sheets 320, a reflection plate 330 and a receiving container 350.

The optical sheets 320 are disposed on the LGP 310 to increase an efficiency of light incident from the LGP 310. The optical sheet 320 may include, for example, a diffusion sheet, a prism sheet, etc.

The reflection plate 330 is disposed below the LGP 310 to reflect light that may leak, or be directed downward instead of upward, from the LGP 310.

The receiving container 350 includes a bottom portion and side walls extended from edges of the bottom portion to form a receiving space. The receiving container 350 may receive the reflection plate 330, the LGP 310, the first infrared light-emitting part 420, the second infrared light-emitting part 430, the visible light-emitting part 440 and the optical sheets 320.

The light-emitting assembly 400 may further include a mold frame 130. The mold frame 130 is disposed between the touch screen panel 120 and the optical sheets 320. The mold frame 130 and the receiving container 350 support the touch screen panel 120. The mold frame 130 may further fix the LGP 310, the optical sheets 320 and the reflection plate 330 to the receiving container 350.

Figure 5:
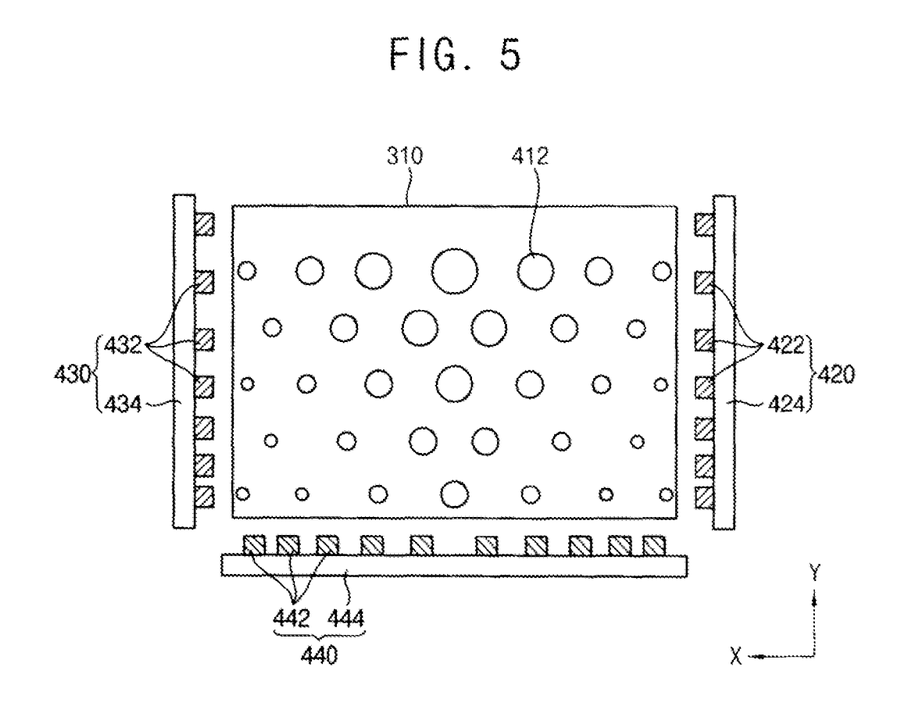
FIG. 5 is a plan view schematically explaining a light-emitting assembly of FIG. 1.

FIG. 5 is a plan view schematically explaining a light-emitting assembly of FIG. 1. In FIG. 5, a first infrared light-emitting part 420, a second infrared light-emitting part 430 and a visible light-emitting part 440 are respectively disposed at side portions of the LGP 310 are shown.

Referring to FIG. 5, printed patterns 412 are formed on a rear surface of the LGP 310. The printed patterns 412 include light diffusing agents and binder resins binding the light diffusing agents to a rear surface of the LGP 310. Sizes of the printed patterns 412 may be gradually increased in a direction away from the visible light-emitting part 440. Moreover, sizes of the printed patterns 412 may be gradually increased in a direction away from the first and second infrared light-emitting parts 420 and 430. Furthermore, the printed patterns 412 are arranged substantially in parallel with a long side of the LGP 310.

Infrared LEDs 422 of the first infrared light-emitting part 420 are disposed on the first PCB 424 with different-sized intervals between the LEDs 422.

Infrared LEDs 432 of the second infrared light-emitting part 430 are disposed on the second PCB 434 with different-sized intervals between the LEDs 432. The interval between the infrared LEDs of the first infrared light-emitting part 420 and the interval between the infrared LEDs of the second infrared light-emitting part 430 are gradually increased in a direction away from the visible light-emitting part 440.

Visible LEDs 442 of the visible light-emitting part 440 are disposed on a third PCB 444 with different-sized intervals between the LEDs 442. The interval between the visible LEDs of the visible light-emitting part 440 is gradually decreased in a direction away from a center portion of the LGP 310.

Figure 6A:
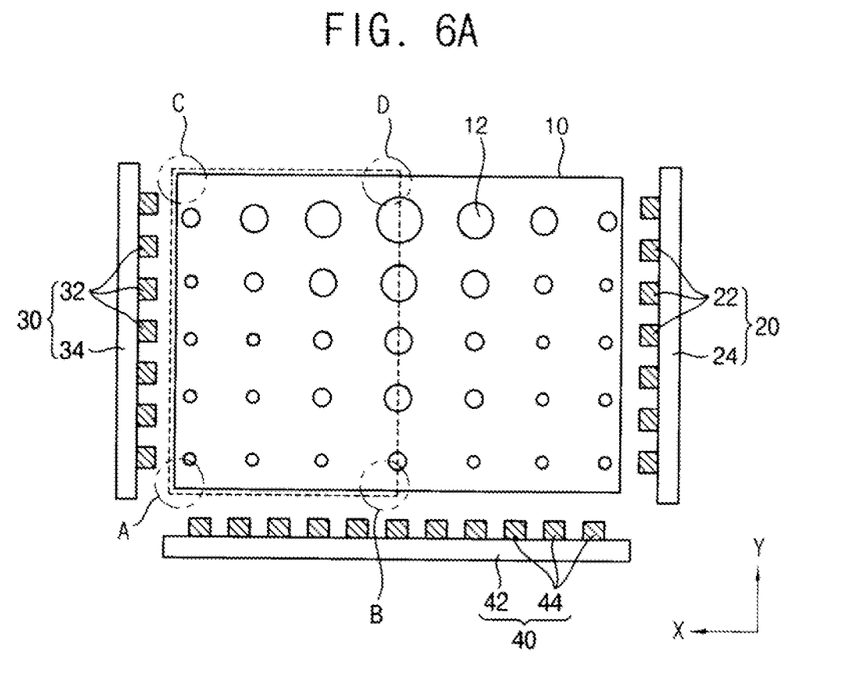
FIG. 6A is a plan view schematically explaining a light-emitting assembly according to one comparative embodiment.

FIG. 6A is a plan view schematically explaining a light-emitting assembly according to one exemplary embodiment.

Referring to FIG. 6A, a light-emitting assembly according to one exemplary embodiment includes an LGP 10, a first visible light-emitting part 20, a second visible light-emitting part 30 and a third visible light-emitting part 40. In FIG. 6A, the LGP 10 may have a rectangular shape having a first long side, a second long side, a first short side and a second short side.

The first and second visible light-emitting parts 20 and 30 are disposed along the first short side and the second short side of the LGP 10, respectively, and the third visible light-emitting part 40 is disposed at the first long side of the LGP 10. A plurality of visible LEDs is disposed on the first to third visible light-emitting parts. In this case, an interval between the visible LEDs, that is, the pitch of the visible LEDs is substantially uniform.

In one exemplary embodiment, a size of the LGP 10 was 886 mm×498 mm. Printed patterns 12 formed on a rear surface of the LGP 10 were summarized as following Table 1.

TABLE 1

|  | X dot | Y dot |
| --- | --- | --- |
| Min |  | 0.53 mm |
| Max |  | 1.2 mm |
| Number of Dots | 220 | 143 |
| Pitch of Dots | 4 mm | 3.475 mm |

Referring to Table 1, the minimum length (for instance, a diameter if the printed patterns are circular as shown in FIG. 6A) of the printed patterns 12, which are formed along the X-axis direction of the LGP 10 and along the Y-axis direction of the LGP 10, is about 0.53 mm, and the maximum length of the printed patterns 12 is about 1.2 mm.

Two hundred twenty printed patterns 12 are formed along the X-axis direction, and one hundred forty three printed patterns 12 are formed along the Y-axis direction. In this case, a pitch between center points of the printed patterns 12 formed along the X-axis direction is about 4 mm, and a pitch between center points of the printed patterns 12 formed along the Y-axis direction is about 3.475 mm.

Figure 6B:
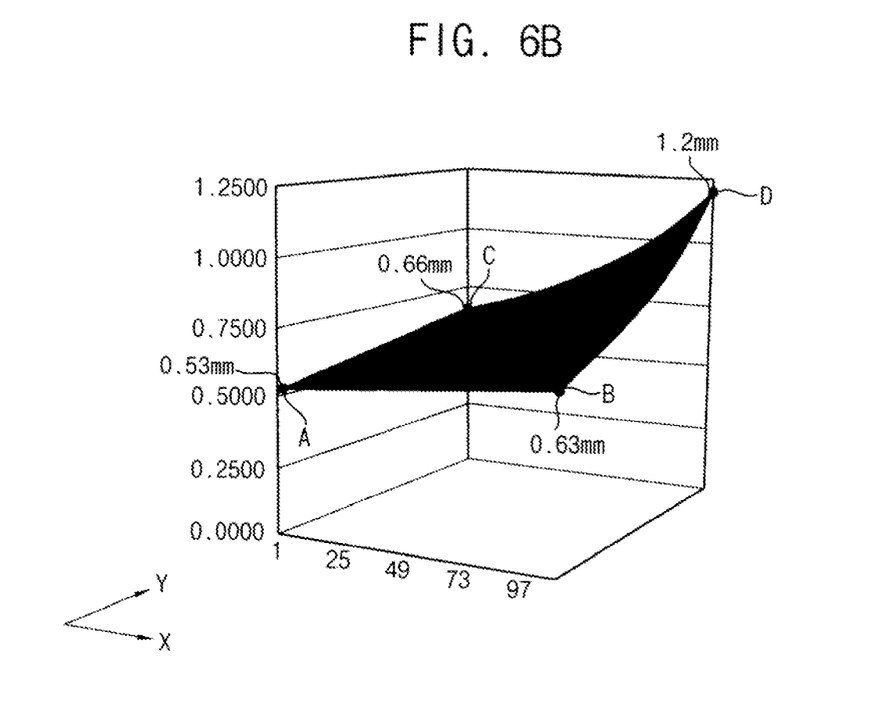
FIG. 6B is a graph showing a size distribution of printed patterns formed on a light guide plate (LGP) of FIG. 6A.

FIG. 6B is a graph showing a distribution of sizes of printed patterns formed on an LGP of FIG. 6A.

Referring to FIGS. 6A and 6B, a printed pattern 12 that is formed on a first area 'A' has a size, which in this case is a diameter as the printed pattern 12 is circular, of about 0.53 mm. The first area 'A' of the LGP 10 is an area near the second visible light-emitting part 30 and the third visible light-emitting part 40.

The size (diameter) of the printed pattern formed on a second area 'B' of the LGP 10 12 is about 0.63 mm. The second area 'B' of the LGP 10 is an area near the third visible light-emitting part 40 and far from the second visible light-emitting part 30 (between the second visible light-emitting part 30 and the first visible light-emitting part 20).

The size (diameter) of the printed pattern 12 formed on a third area 'C' of the LGP 10 is about 0.66 mm. The first area 'C' of the LGP 10 is an area far from the third visible light-emitting part 40 and near the second visible light-emitting part 30. In FIG. 6A, it is described that the printed pattern 12 has a circular shape. However, the shape of the printed pattern 12 is not limited to that exemplary embodiment. That is, the printed pattern 12 may have an elliptical shape, a quadrangular shape, etc.

The (diameter) of a printed pattern 12 formed on a fourth area 'D' of the LGP 10 is about 1.2 mm. Fourth area 'D' of the LGP 10 is far from the third visible light-emitting part 40 and the third visible light-emitting part 30 (between third light emitting part 30 and first light-emitting part 20).

The LGP explained in FIG. 4A was designed to provide a uniform luminance distribution for the visible light that is emitted from visible LEDs disposed at three sides of the LGP 10.

A simulation of the optical characteristics of a light-emitting assembly that includes an infrared LED was performed. Specifically, the optical characteristics of a light-emitting assembly in which a visible LED is disposed along a long side of the LGP 10 designed as shown in FIG. 6A, and an infrared LED is disposed at two short sides of the LGP 10. Hereinafter, the optical characteristics of the light-emitting assembly will be described with references to the following FIGS. 7A and 7B.

Figure 7A:
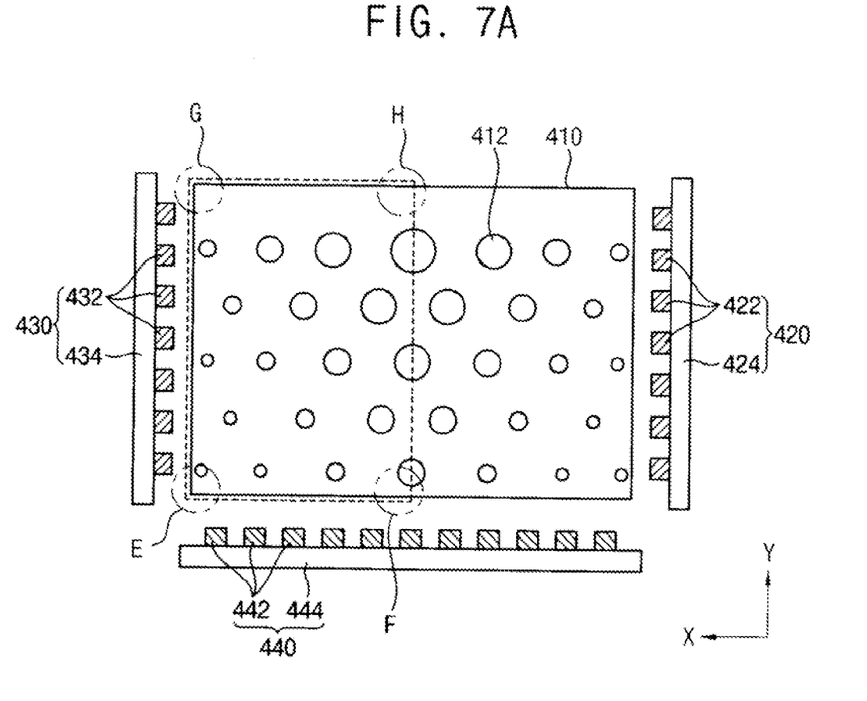
FIG. 7A is a plan view schematically explaining a light-emitting assembly according to another comparative embodiment.

FIG. 7A is a plan view schematically illustrating a light-emitting assembly according to another exemplary embodiment.

Referring to FIG. 7A, The light-emitting assembly includes an LGP 10, a first infrared light-emitting part 420, a second infrared light-emitting part 430 and a visible light-emitting part 440.

The LGP 10 is substantially the same as the LGP 10 of FIG. 6A.

The first infrared light-emitting part 420 is disposed along a first short side of the LGP 10 to emit infrared lights to the LGP 10 used to identify a touch occurring on the touch screen panel. In this case, intervals between infrared LEDs of the first infrared light-emitting part 420 are substantially the same as each other.

The second infrared light-emitting part 430 is disposed along a second short side of the LGP 10 to emit infrared lights to the LGP 10 used to identify a touch occurring on the touch screen panel. In this case, intervals between infrared LEDs of the second infrared light-emitting part 430 are substantially the same as each other.

The visible light-emitting part 440 is disposed along a first long side of the LGP 10 to emit light to the LGP 10 used to display an image on the touch screen panel. In this case, intervals between visible LEDs of the visible light-emitting part 440 are substantially the same as each other.

Figure 7B:
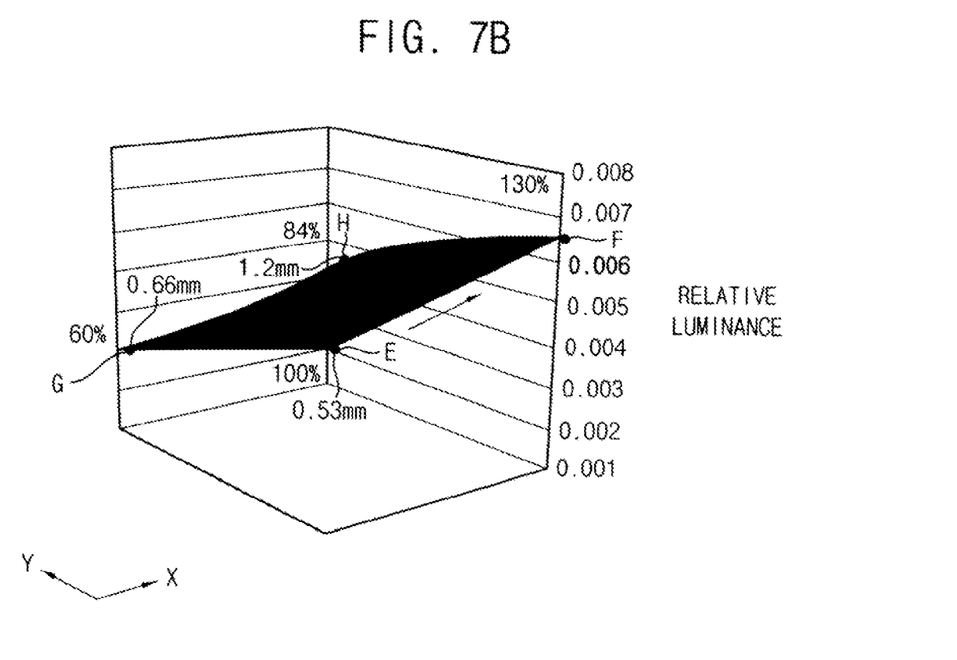
FIG. 7B is a graph showing a relative luminance distribution of light-emitting assembly of FIG. 7A.
Figure 7C:
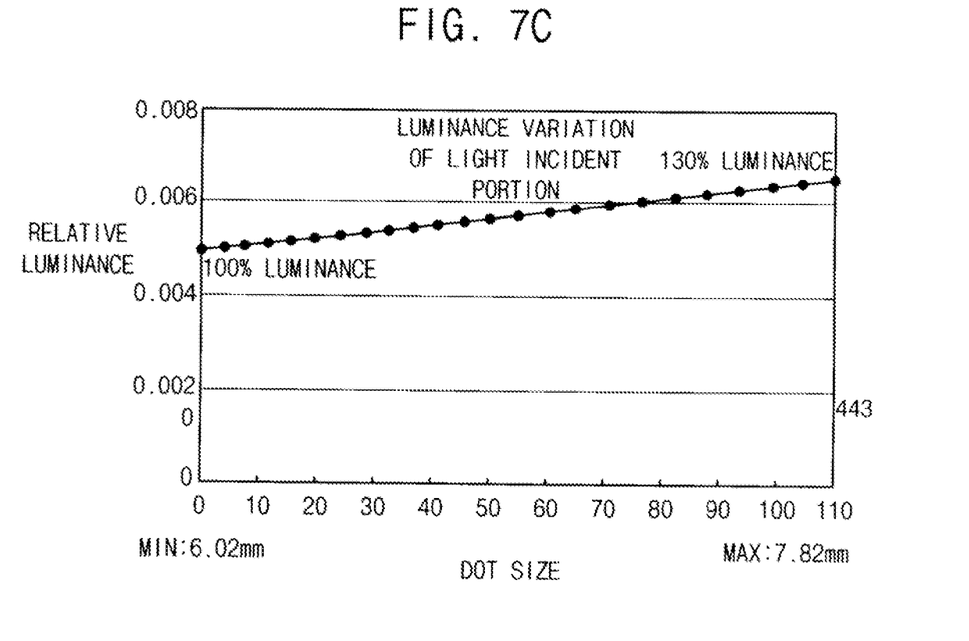
FIG. 7C is a graph showing a simulation result of an X-axis direction in the graph shown in FIG. 7B.

FIG. 7B is a graph showing a distribution of relative luminance of light-emitting assembly of FIG. 7A. FIG. 7C is a graph showing results of a simulation of an X-axis direction in the graph shown in FIG. 7B.

Referring to FIGS. 7A and 7B, luminance was measured at a first area 'E' of the LGP 10, which is an area near the second infrared light-emitting part 430 and the visible light-emitting part 440. In this case, it was assumed that the measured luminance is 100% as a relative luminance.

Luminance was measured at a second area 'F' of the LGP 10, which is an area near the visible light-emitting part 440 and far from the second infrared light-emitting part 430 (between the second infrared light-emitting part 430 and the first light-emitting part 420). In this case, when the measured luminance is converted into a relatively luminance, the converted relative luminance is about 130%.

Luminance was measured at a third area 'G' of the LGP 10, which is an area far from the visible light-emitting part 440 and near the second infrared light-emitting part 430. In this case, when the measured luminance is converted into a relatively luminance, the converted relative luminance is about 130%.

Luminance was measured at a fourth area 'H' of the LGP 10, which is an area far from the visible light-emitting part 440 and from the second visible light-emitting part 430 (between the second visible light-emitting part 430 and the first visible light-emitting part 420). In this case, when the measured luminance is converted into a relative luminance, the converted relative luminance is about 84%.

Thus, when an LGP designed in FIG. 7A is employed in a light-emitting assembly having infrared LEDs used to identify a touch, a variation of luminance along the X-axis direction is about 30%.

However, when pitches of the visible LEDs are linearly varied about 30%, the variation in uniformity of the luminance along the X-axis direction may be compensated for. For example, visible LEDs are disposed to linearly increase pitches between the centers of the visible LEDs in a direction away from an edge portion of an LGP toward a central portion of the LGP when a maximum pitch of the visible LEDs and a minimum pitch of the visible LED are set to about 7.82 mm and about 6.02 mm, respectively, (i.e., the maximum pitch/the minimum pitch=7.82 mm/6.02 mm=1.3). That is, the pitch between the centers of the visible LEDs positioned along the edge portion of the LGP is increased by about 30% with respect to the pitch of the visible LEDs positioned at the central portion of the LGP. Thus, the uniformity of luminance along the X-axis direction may be improved.

Printed patterns having sizes which are varied along the Y-axis direction and the X-axis direction are formed on a rear surface of the LGP 10 designed as shown in FIG. 6A. That is, in an area near the second infrared light-emitting part 430, the size of the printed patterns 12 is starts small near the visible light-emitting part 440, and is increased from about 0.53 mm to about 0.66 mm along the Y-axis direction parallel with a short side of the LGP 10. Moreover, in an area farther from the second infrared light-emitting part 430 (between the second infrared light-emitting part 430 and the first infrared light-emitting part 420), the size of the printed patterns 12 is gradually increased from about 0.63 mm to about 1.2 mm along the Y-axis direction parallel with the short side of the LGP 10.

However, in order to improve the uniformity of luminance in accordance with the present embodiments, sizes of printed patterns are varied so as to gradually increase from about 0.53 mm to about 0.8 mm along the Y-axis direction parallel with a short side of an LGP in an area near the second infrared light-emitting part 430. Moreover, sizes of printed patterns are varied so as to gradually increase from about 0.63 mm to about 1.4 mm along the Y-axis direction parallel with the short side of an LGP in an area between the second infrared light-emitting part 430 and the first infrared light-emitting part 420. Thus, a size distribution of the printed patterns is changed along the Y-axis direction, so that uniformity of luminance in the Y-axis direction may be enhanced.

As described above, pitches between centers of the visible LEDs are gradually increased in a direction away from an edge portion of the visible light-emitting part toward a center portion of the visible light-emitting part, so that uniformity of luminance in the X-axis direction may be enhanced. Moreover, sizes of the printed patterns of the LGP are gradually increased along the Y-axis direction parallel with a short side of the LGP, so that uniformity of luminance in the Y-axis direction may be enhanced.

In scanning of an infrared LED, to achieve straightness of the infrared light, a lenticular lens pattern may be formed on whole surface of the LGP. The straightness of the infrared light may be achieved due to the lenticular lens pattern; however, light leakage may be generated at a light incident portion of the LGP adjacent to a visible LED.

Figure 8A:
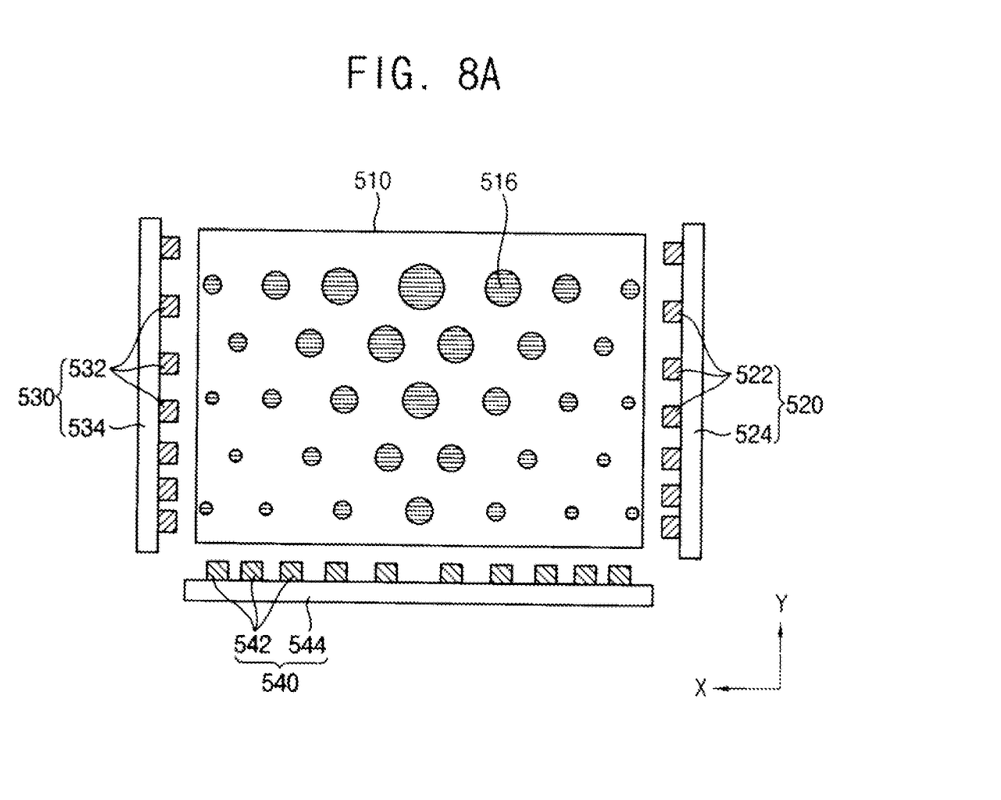
FIG. 8A is a plan view schematically explaining a light-emitting assembly according to another exemplary embodiment.
Figure 8B:
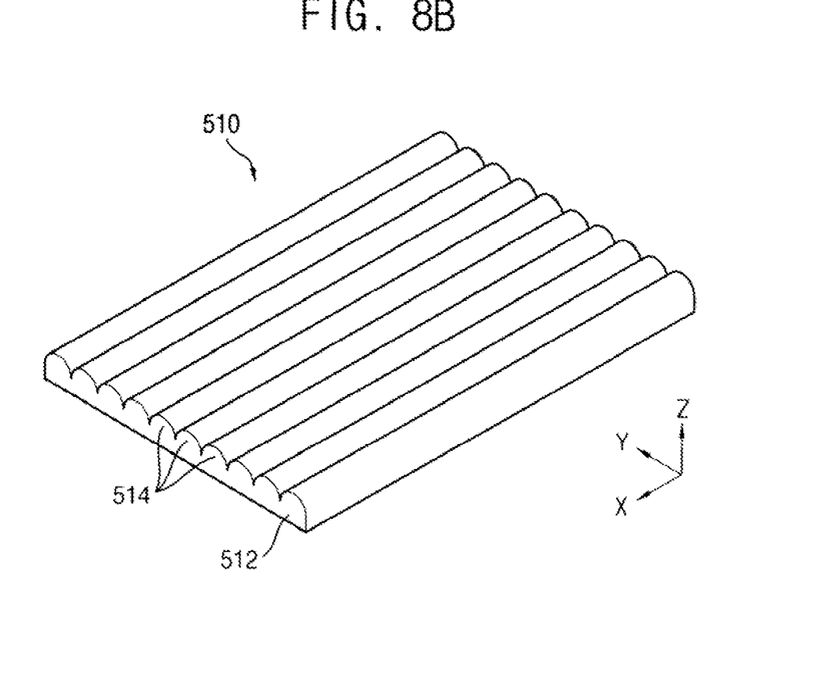
FIG. 8B is a front perspective view schematically showing an LGP shown in FIG. 8A.
Figure 8C:
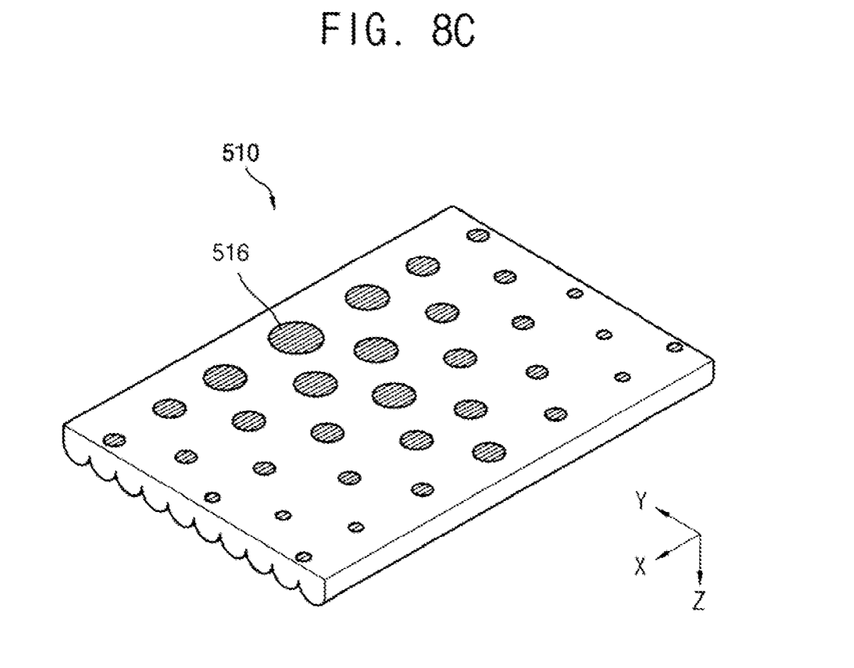
FIG. 8C is a rear perspective view schematically showing an LGP shown in FIG. 8A.
Figure 8D:
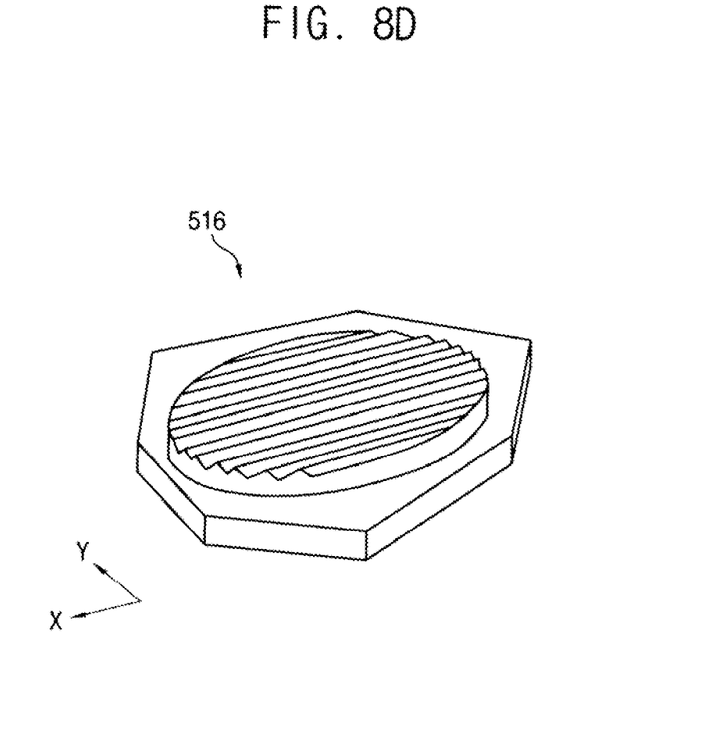
FIG. 8D is an enlarged perspective view showing a printed pattern shown in FIG. 8C.

FIG. 8A is a plan view schematically illustrating a light-emitting assembly according to another exemplary embodiment. FIG. 8B is a front perspective view schematically showing an LGP shown in FIG. 8A. FIG. 8C is a rear perspective view schematically showing an LGP shown in FIG. 8A. FIG. 8D is an enlarged perspective view showing a printed pattern shown in FIG. 8C.

Referring to FIGS. 8A to 8D, a light-emitting assembly according to another exemplary embodiment includes an LGP 510, a first infrared light-emitting part 520, a second infrared light-emitting part 530 and a visible light-emitting part 540.

A lenticular lens pattern is formed on an upper surface of the LGP 510. As shown in FIG. 8B, a lenticular lens is extended along the X-axis direction, and the lenticular lenses are arranged along the Y-axis direction. Accordingly, the straightness of infrared lights emitted from the first and second infrared light-emitting parts 520 and 530 may be increased, which are disposed at an incident portion of the LGP 510.

Plural printed patterns 516 are formed on a rear surface of the LGP 510. The printed patterns 516 include, for example, light diffusing agents and binder resins binding the light diffusing agents to the rear surface of the LGP 510. Sizes of the printed patterns 516 may be gradually increased in a direction away from the visible light-emitting part 540.

Moreover, sizes of the printed patterns 516 may be gradually increased in a direction away from the first and second infrared light-emitting parts 520 and 530. Furthermore, the printed patterns 516 are arranged substantially in parallel with a long side of the LGP 510.

In order to increase a straightness of infrared light emitted from the first and second infrared light-emitting parts 520 and 530, prism lenses or lenticular lenses may be further formed on the printed patterns 516. The prism lenses or the lenticular lenses are extended along the X-axis direction, and are arranged along the Y-axis direction, as shown in FIG. 8D. In the present exemplary embodiment, a top portion of the prism lens may have a triangular shape, and a top portion of the lenticular lens may have a rounded triangular shape.

The infrared light-emitting part 520 is disposed along a first short side of the LGP 510 to emit lights for identifying the occurrence of a touch on the touch screen panel. In this case, intervals between the infrared LEDs of the first infrared light-emitting part 520 are different from each other.

The second infrared light-emitting part 530 is disposed along a second short side of the LGP 510 to emit lights for identifying a touch to the LGP 510. In this case, intervals between infrared LEDs of the second infrared light-emitting part 530 are different from each other. An interval between the infrared LEDs of the first infrared light-emitting part 520 and an interval between the infrared LEDs of the second infrared light-emitting part 530 are gradually increased in a direction away from the visible light-emitting part 540.

The visible light-emitting part 540 is disposed along a first long side of the LGP 510 to emit lights for displaying an image to the LGP 510. In this case, intervals between visible LEDs of the visible light-emitting part 540 are different from each other. An interval between the visible LEDs of the visible light-emitting part 540 is gradually decreased in a direction away from a center portion of the LGP 510.

As described above, according to another exemplary embodiment, prisms are formed on printed patterns formed on a rear surface of an LGP, so that light leakage that may occur at an incident portion of the LGP adjacent to a visible LED may be prevented. Moreover, straightness of light exiting of an infrared LED may be enhanced.

Figure 9A:
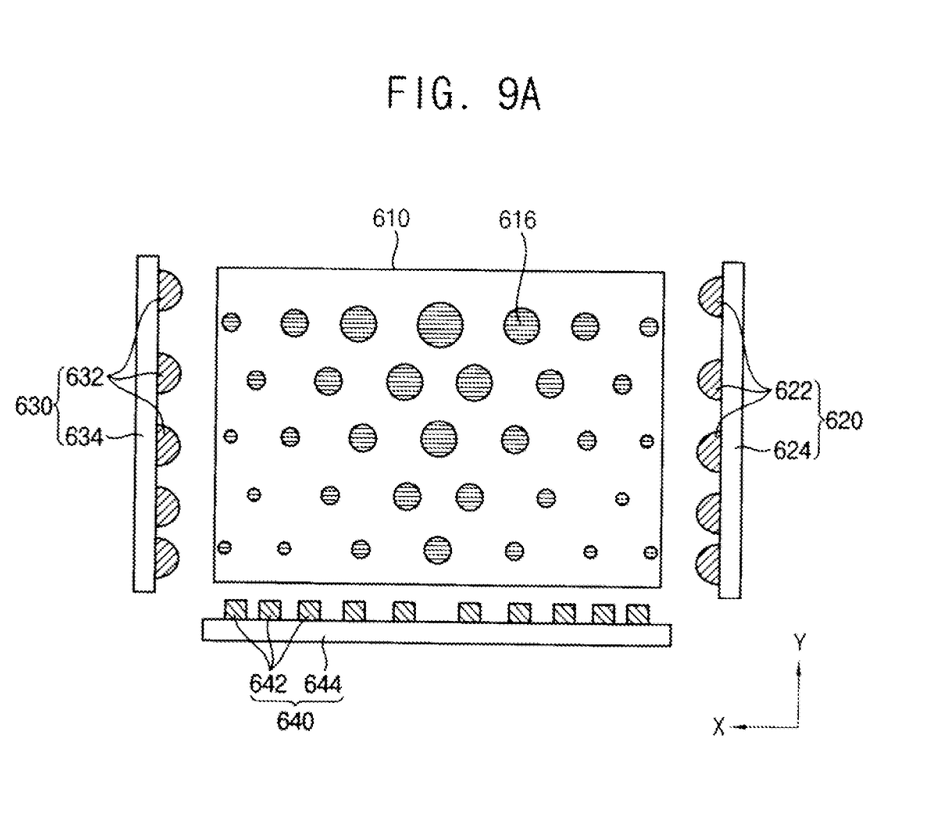
FIG. 9A is a plan view schematically explaining a light-emitting assembly according to still another exemplary embodiment.
Figure 9B:
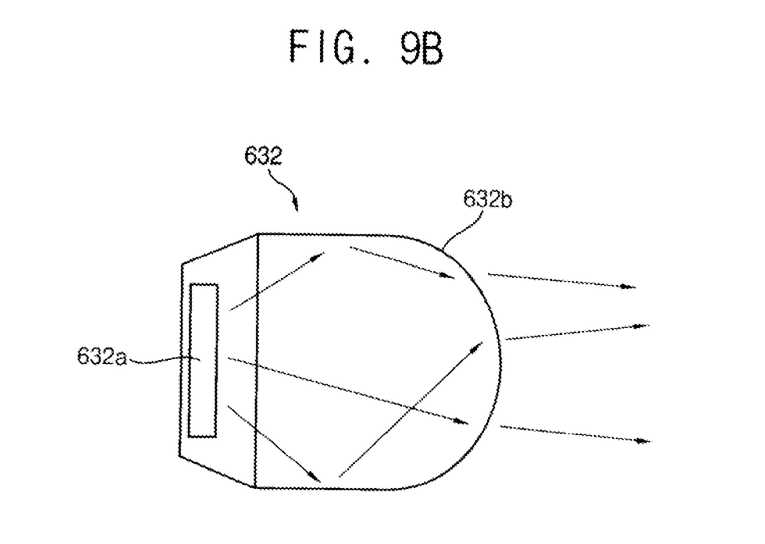
FIG. 9B is a cross-sectional view showing a cannonball shape LED shown in FIG. 9A.
Figure 9C:
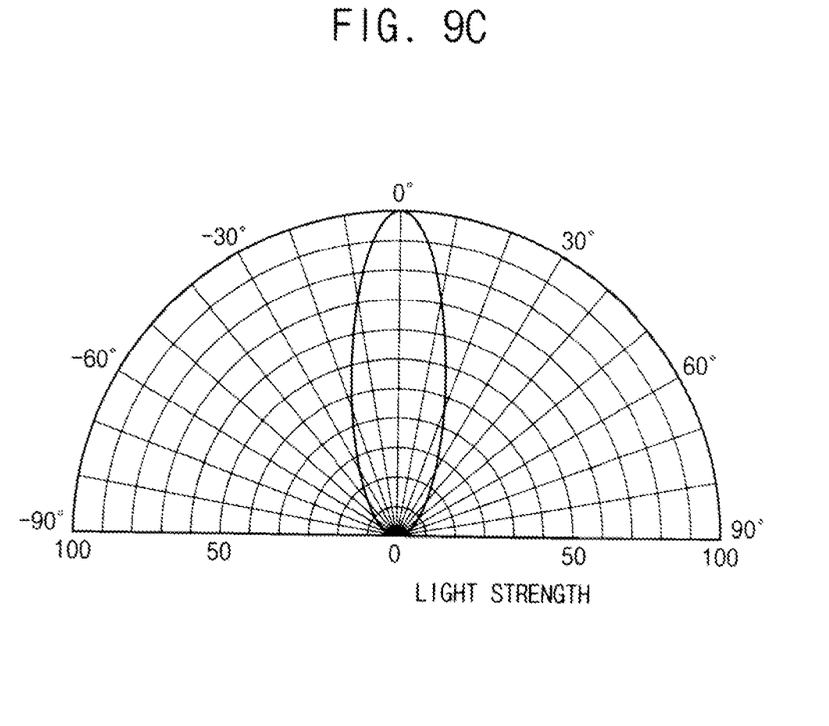
FIG. 9C is a graph showing a light directivity of the cannonball shape LED shown in FIG. 9A.

FIG. 9A is a plan view schematically explaining a light-emitting assembly according to still another exemplary embodiment. FIG. 9B is a cross-sectional view showing a cannonball shape LED shown in FIG. 9A. FIG. 9C is a graph showing a light directivity of the cannonball shape LED shown in FIG. 9A.

Referring to FIG. 9A, a light-emitting assembly according to still another exemplary embodiment includes an LGP 610, a first infrared light-emitting part 620, a second infrared light-emitting part 630 and a visible light-emitting part 640.

A lenticular lens pattern is formed on an upper surface of the LGP 610. In the lenticular lens pattern, a lenticular lens is extended along the X-axis direction, and the lenticular lenses are arranged along the Y-axis direction. Accordingly, the straightness of infrared light emitted from the first and second infrared light-emitting parts 620 and 630, which are disposed at an incident portion of the LGP 610 may be increased.

Printed patterns 616 are formed on a rear surface of the LGP 610. The printed patterns 616 include, for example, light diffusing agents and binder resins binding the light diffusing agents to a rear surface of the LGP 610. Sizes of the printed patterns 616 may be gradually increased in a direction away from the visible light-emitting part 640. Moreover, sizes of the printed patterns 616 may be gradually increased in a direction away from the first and second infrared light-emitting parts 620 and 630. Furthermore, the printed patterns 616 are arranged substantially in parallel with a long side of the LGP 610. In order to increase the straightness of infrared light emitted from the first and second infrared light-emitting parts 620 and 630, as shown in FIG. 8D, prism lenses or lenticular lenses may be further formed on the printed patterns 616.

The first infrared light-emitting part 620 is disposed along a first short side of the LGP 610 to emit lights for identifying a touch to the LGP 610. In this case, intervals between infrared LEDs of the first infrared light-emitting part 620 are different from each other.

The second infrared light-emitting part 630 is disposed along a second short side of the LGP 610 to emit lights for identifying a touch to the LGP 610. In this case, intervals between infrared LEDs of the second infrared light-emitting part 630 are different from each other. An interval between the infrared LEDs of the first infrared light-emitting part 620 and an interval between the infrared LEDs of the second infrared light-emitting part 630 are gradually increased in a direction away from the visible light-emitting part 640.

The infrared LEDs of the first and second infrared light-emitting parts 620 and 630 shown in FIG. 9A may be a cannonball shape LED. As shown in FIG. 9B, the cannonball shape LED may further include a light-condensing cap 632b so as to increase the straightness of infrared light emitted from the infrared LED 632a.

As shown in FIG. 9C, it is recognized that infrared light emitted from the cannonball shape LED have a directivity angle of about −30 degrees to about 30 degrees due to the light-condensing cap 632b.

The visible light-emitting part 640 is disposed along a first long side of the LGP 610 to emit light for displaying an image on the touch screen panel. In this case, intervals between visible LEDs of the visible light-emitting part 640 are different from each other. An interval between the visible LEDs of the visible light-emitting part 640 is gradually decreased in a direction away from a center portion of the LGP 610.

Conventionally, in order to scan infrared light emitted from an infrared LED, when a lenticular lens pattern is formed on a whole surface of an LGP, light leakage may occur at a light incident portion of the LGP adjacent to a visible LED. However, according to still another exemplary embodiment, a cannonball shape infrared LED is employed in a light-emitting assembly, so that straightness of infrared lights may be secured. In addition, it may prevent light leakage from occurring at a light incident portion of an LGP.

As described above, in an edge-illumination type light-emitting assembly, infrared LEDs emitting infrared light are disposed by different-sized intervals and visible LEDs emitting visible lights are disposed by different-sized intervals, so that infrared light and visible light that are emitted from two kinds of light sources may be uniformly provided to a touch screen panel.

The foregoing is illustrative and is not to be construed as limiting thereof. Although example embodiments have been described, those skilled in the art will readily appreciate that many modifications are possible in the example embodiments without materially departing from the novel teachings and advantages of the present disclosure. Accordingly, all such modifications are intended to be included within the scope of the present invention as provided in this disclosure, including the claims. In the claims, means-plus-function clauses are intended to cover the structures described herein as performing the recited function and not only structural equivalents but also equivalent structures. Therefore, it is to be understood that the foregoing is illustrative and is not to be construed as limited to the specific example embodiments disclosed, and that modifications to the disclosed example embodiments, as well as other example embodiments, are intended to be included within the scope of the disclosure, including the appended claims.

What is claimed is:

1. A light-emitting assembly comprising:
   a light guide plate (LGP) having printed patterns formed on a lower surface thereof;
   a first infrared light-emitting part including a plurality of first infrared light-emitting diodes (LEDs) disposed at a first side of the LGP, the first infrared LEDs spaced apart by first intervals wherein at least two of the first intervals have different sizes;
   a second infrared light-emitting part including a plurality of second infrared LEDs disposed at a second side of the LGP, the second infrared LEDs spaced apart by second intervals wherein at least two of the second intervals have different sizes; and
   a visible light-emitting part including a plurality of visible LEDs disposed at a third side of the LGP, the visible LEDs spaced apart by third intervals wherein at least two of the third intervals have different sizes,
   wherein the first intervals between the first infrared LEDs and the second intervals between the second infrared LEDs are gradually increased in a direction away from the visible light-emitting part.

2. The light-emitting assembly of claim 1, wherein sizes of the printed patterns are gradually increased in a direction away from the visible light-emitting part.

3. The light-emitting assembly of claim 1, wherein sizes of the printed patterns are gradually increased in a direction away from the first and second infrared light-emitting parts.

4. The light-emitting assembly of claim 1, wherein the printed patterns are arranged substantially in parallel with the third side of the LGP.

5. The light-emitting assembly of claim 1, wherein a shape of the printed pattern is one of a circular shape and an ellipse shape when viewed from a plane.

6. The light-emitting assembly of claim 1, wherein the printed pattern comprises a lenticular lens pattern.

7. The light-emitting assembly of claim 1, wherein the printed pattern comprises a prism lens pattern.

8. The light-emitting assembly of claim 7, wherein a prism of the prism lens pattern is in parallel with the third side of the LGP.

9. The light-emitting assembly of claim 1, wherein a lenticular lens pattern, which is extended along a direction parallel with a direction of the visible light-emitting part and arranged along a direction parallel with a direction of the first and second infrared light-emitting parts, is further formed on an upper surface of the LGP.

10. The light-emitting assembly of claim 9, wherein the infrared LED further comprises a light-condensing cap which condenses infrared lights.

11. The light-emitting assembly of claim 1, wherein a pitch of a visible LED corresponding to an edge portion of the LGP is increased by about 30% with respect to a pitch of a visible LED corresponding to a center portion of the LGP.

12. The light-emitting assembly of claim 11, wherein the size of the printed patterns is gradually increased from about 0.53 mm to about 0.8 mm along a direction parallel with the first side of the LGP, in a near area of the first and second infrared light-emitting parts.

13. The light-emitting assembly of claim 11, wherein the size of the printed patterns is gradually increased from about 0.63 mm to about 1.4 mm along a direction parallel with the first side of the LGP, in a far area of the first and second infrared light-emitting parts.

14. An interactive display device comprising:
   a touch screen panel; and
   a light-emitting assembly disposed below the touch screen panel to provide the touch screen panel with light for displaying an image and light for identifying a touch, the light-emitting assembly comprising:
   a light guide plate (LGP) having printed patterns formed on a lower surface thereof;

a first infrared light-emitting part including a plurality of first infrared light-emitting diodes (LEDs) disposed at a first side of the LGP, the first infrared LEDs spaced apart by first intervals wherein at least two of the first intervals have different sizes;

a second infrared light-emitting part including a plurality of second infrared LEDs disposed at a second side of the LGP, the second infrared LEDs spaced apart by second intervals wherein at least two of the second intervals have different sizes; and a visible light-emitting part including a plurality of visible LEDs disposed at a third side of the LGP, the visible LEDs spaced apart by third intervals wherein at least two of the third intervals have different sizes, wherein the first intervals between the first infrared LEDs and second intervals between the second infrared LEDs are gradually increased in a direction away from the visible light-emitting part.

15. The interactive display device of claim 14, wherein a lenticular lens pattern, which is extended along a direction parallel with a direction of the visible light-emitting part and arranged along a direction parallel with a direction of the first and second infrared light-emitting parts, is further formed on an upper surface of the LGP.

16. The interactive display device of claim 15, wherein the infrared LED further comprises a light-condensing cap which condenses infrared lights.

17. A light-emitting assembly comprising:

a light guide plate (LGP) having printed patterns formed on a lower surface thereof;

a first infrared light-emitting part including a plurality of first infrared light-emitting diodes (LEDs) disposed at a first side of the LGP, the first infrared LEDs spaced apart by first intervals wherein at least two of the first intervals have different sizes;

a second infrared light-emitting part including a plurality of second infrared LEDs disposed at a second side of the LGP, the second infrared LEDs spaced apart by second intervals wherein at least two of the second intervals have different sizes; and a visible light-emitting part including a plurality of visible LEDs disposed at a third side of the LGP, the visible LEDs spaced apart by third intervals wherein at least two of the third intervals have different sizes, wherein the third intervals between the visible LEDs of the visible light-emitting part are decreased in a direction away from a center portion of the LGP.

18. A interactive display device comprising:

a touch screen panel; and a light-emitting assembly disposed below the touch screen panel to provide the touch screen panel with light for displaying an image and light for identifying a touch, the light-emitting assembly comprising:

a light guide plate (LGP) having printed patterns formed on a lower surface thereof;

a first infrared light-emitting part including a plurality of first infrared light-emitting diodes (LEDs) disposed at a first side of the LGP, the first infrared LEDs spaced apart by first intervals wherein at least two of the first intervals have different sizes;

a second infrared light-emitting part including a plurality of second infrared LEDs disposed at a second side of the LGP, the second infrared LEDs spaced apart by second intervals wherein at least two of the second intervals have different sizes; and a visible light-emitting part including a plurality of visible LEDs disposed at a third side of the LGP, the visible LEDs spaced apart by third intervals wherein at least two of the third intervals have different sizes, wherein the third intervals between the visible LEDs of the visible light-emitting part are decreased in a direction away from a center portion of the LGP.

* * * * *